June 10, 1924.
C. DAVIS
1,497,552
TRACTOR HITCH FOR WHEELED SCRAPERS
Filed Jan. 31, 1923
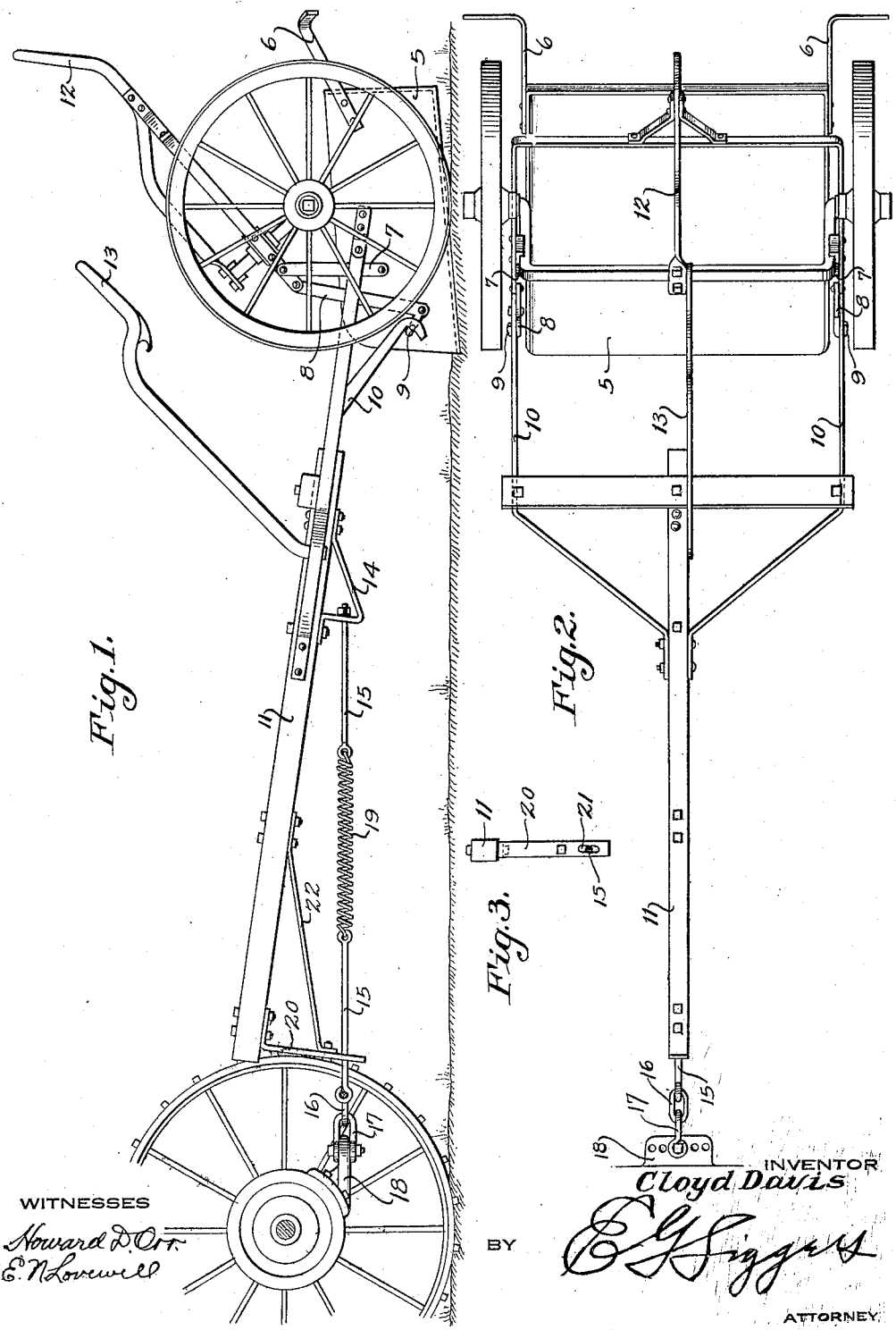
INVENTOR
Cloyd Davis
ATTORNEY Patented June 10, 1924.

1,497,552

UNITED STATES PATENT OFFICE.

CLOYD DAVIS, OF MINEOLA, NEW YORK.

TRACTOR HITCH FOR WHEELED SCRAPERS.

Application filed January 31, 1923. Serial No. 616,096.

*To all whom it may concern:*

Be it known that I, CLOYD DAVIS, a citizen of the United States, residing at Mineola, Long Island, in the county of Nassau and State of New York, have invented a new and useful Improvement in Tractor Hitches for Wheeled Scrapers, of which the following is a specification.

My invention relates to a tractor hitch for wheeled scrapers, and its object is to provide an improved device of this nature which may be secured to the tongue of a wheeled scraper to connect the same to the draw bar of a Fordson tractor, which is usually located beneath the axle thereof, and yet hold the tongue and working parts of the scraper in the same position as when drawn by horses.

In order to secure the best and greatest efficiency from tractors, the draft bar is located beneath the rear axle of the tractor about a foot from the ground, while in the horse-drawn scraper the end of the pole, which is carried by the neck yoke, is about three feet from the ground and the pole is directed forwardly and upwardly. Under such conditions, wheeled scrapers are practically valueless when used in connection with tractors, particularly the Fordson, as the draft bar of the tractor is so low that it throws the scraper out of balance which causes the tractor to bury itself while loading the scraper, when the scraper digs into the ground.

In carrying out my invention, I have provided a draft device which may be attached to the tongue of any horse-drawn scraper after part of the tongue has been cut off so that the tongue is then carried in the same relative position, as in a horse-drawn scraper, the draft attachment to the tongue providing for a straight horizontal draft between the tongue of the scraper and the tractor, thereby maintaining the scraper in its proper balance at all times.

The invention will be best understood from the following detailed description, taken in connection with the accompanying drawing which illustrates the preferred form of the invention.

In the drawing:—

Fig. 1 is a side elevation of the invention in operative position.

Fig. 2 is a plan view thereof.

Fig. 3 is a front elevation of the tongue, showing the front bracket.

Referring to the drawing in detail, the wheeled scraper includes a body 5 provided with handles 6, and supported by links 7 and 8, the latter being provided with a mud hook 9 which engages a draft hook 10 to hold the scraper body in operative position for filling. The draft hook is rigidly secured to the tongue 11 and projects downwardly and rearwardly and is so disposed with relation to the mud hook 9 that the latter may be readily disengaged by pulling downwardly on the lever 12 in order to dump the load. The hook 13 is usually provided to hook the scraper up when transporting the same from one piece of work to another.

The above described parts are such as are usually provided on a wheeled scraper which is adapted to be drawn by horses.

In the described construction, the draft hook 10 is stationary while the mud hook 9 is movable, but in other types of scrapers the hook 10 is movable while the hook 9 is stationary.

When loading, the draft of the scraper has to be on the front of the bowl or body 5 to load, and either the mud hook 9 or the draft hook 10 has to be movable to allow for the free action necessary to point the scraper up or down to cause it to engage with the earth to fill the bowl while the scraper is in motion, and also to disengage for dumping.

In adapting the scraper for use with a tractor, the same relative distance must be maintained for the draft device above the level of the ground as in horse-drawn scrapers in order to cause the hooks 9 and 10 to properly engage for filling the scraper.

The salient feature of my invention provides for the elevation of the tongue at the proper angle. Without some such provision, if the scraper were hitched to the tractor draft bar, it would lower the bowl to such an extent that the hook 10 would be thrown so far back that it would not engage the mud hook 9, and instead of filling the bowl, the latter would turn over often injuring the men loading it. After loading the scraper, the bowl or body 5 tips back, and if the tongue is not in the proper position, it points the mouth of the bowl down and causes it to catch into the ground and dump the load before arriving at its destination.

The operation of the scraper is entirely dependent upon the proper cooperation of the hooks 9 and 10, and to insure this I have found from many experiments that the improved draft device is essential.

In carrying out my invention to adapt the scraper for attachment to a tractor, the forward end of the tongue or pole 11 is cut off about midway between the front end and the hammer strap to which the evener is attached, and the latter is discarded and replaced by a bracket 14 which is secured underneath the tongue and depends downwardly therefrom. This brings the bracket substantially on a level with the usual draft bar of the tractor, and the draw bar 15, which has its rear end attached to the bracket 14, normally extends substantially horizontally when the device is in operation, and the tongue 11 normally extends upwardly and forwardly at the same angle as when the scraper is drawn by horses. The forward end of the draw bar 15 may be connected by a link 16 to a clevis 17 or similar attaching means which is connected with the hitch plate 18 of the tractor. The draw bar 15 is preferably provided with an intermediate spring portion 19 to prevent shock when starting.

A front bracket 20, larger than the bracket 14, is secured in depending relation to the front end of the tongue 11, and is provided with a slot 21 through which the forward end of the draw bar 15 extends, thereby supporting the tongue in its normal position while the draw bar is supported horizontally. A suitable brace bar 22 may be secured to the bracket 20 and extends upwardly and rearwardly where it is suitably secured to an intermediate portion of the tongue.

From the foregoing description, it will be seen that by means of my invention the pole is always held at the proper angle while the scraper body is carried in its proper relation to the ground, and its operation is the same as when drawn by horses. Moreover, both the horse-drawn scraper and the tractor-drawn scraper may be manufactured with the same patterns and may easily be converted from one to the other by means of my invention. By the present invention, the mouth of the scraper is held up while traveling to the dumping ground, thereby preventing a large part of the dirt from falling off as would happen under present conditions. The invention allows the scraper to maintain its proper balance at all times, making it more efficient as to loading, dumping and carrying material. It can be applied to any make of wheel scraper.

While I have shown and described specifically the structure of one form in which the invention may be embodied, it will be understood that this is merely illustrative and that various modifications may be made therein without departing from the scope of the invention as defined by the claims.

What is claimed is:—

1. The combination with a wheeled scraper having a forwardly projecting tongue, of a bracket secured to and depending from the tongue, and means for attaching a draw bar to the bracket at a point spaced from the underside of the tongue, whereby a pull may be exerted on the draw bar in a substantially horizontal line some distance below the tongue, while the latter extends forwardly and upwardly.

2. The combination with a wheeled scraper having a forwardly-projecting tongue, of a pair of brackets depending from the tongue, and a draw bar slidably connected to the forward bracket and having its rear end attached to the rear bracket.

3. The combination with a wheeled scraper having a forwardly-projecting tongue, of a pair of brackets depending from the tongue, a draw bar attached it its rear end to the rear bracket and extending forwardly in divergent relation to the tongue and slidably connected with the front bracket.

4. The combination of a wheeled scraper having a draft tongue normally projecting forwardly and upwardly when the scraper is in operative position, and a draw bar attached underneath the tongue and normally horizontal and adapted to be attached to the hitch plate of a tractor.

5. In a wheeled scraper having a draft tongue normally projecting forwardly and upwardly when the scraper is in operative position, and also having a mud hook and a draft hook adapted to engage each other to hold the bowl of the scraper in proper position for loading and dumping, a bracket depending from the rear part of the tongue, a larger bracket depending from the tongue in front of the first-mentioned bracket, and a draw bar attached to the rear bracket and normally projecting forwardly in a horizontal direction and slidably connected with the front bracket.

In testimony, that I claim the foregoing as my own I have hereto affixed my signature.

CLOYD DAVIS.